United States Patent
Yang

[11] Patent Number: 5,458,711
[45] Date of Patent: Oct. 17, 1995

[54] PROCESS FOR FORMING A GRID OF POLYMERIC MATERIAL FOR SUPPORTING A STRUCTURE

[76] Inventor: Jesse Yang, No. 1, Long 36, Ave. 357, Sec. 2, Nan-Shan Rd., Lu-Jwu Shiang, Taur Yuan Hsien, Taiwan

[21] Appl. No.: 32,053

[22] Filed: Mar. 16, 1993

Related U.S. Application Data

[63] Continuation-in-part of Ser. No. 862,434, Apr. 2, 1992, abandoned.

[51] Int. Cl.$^6$ ............ B29C 55/02; B29C 65/02; B29C 65/48
[52] U.S. Cl. ............ 156/177; 156/178; 156/181; 156/229; 156/243; 156/296; 264/177.19; 264/211.15; 428/134
[58] Field of Search ............ 156/167, 177, 156/178, 180, 181, 229, 243, 244.22, 244.23, 244.24, 244.26, 244.27, 290, 291, 296, 299; 428/112, 114, 134; 264/177.19, 178 R, 178 F, 181, 210.1, 210.2, 210.7, 211.12, 211.15, 211.17, 211.18, 211.2, 289.3, 289.6, 342 RE, DIG: 73, DIG: 81

[56] References Cited

U.S. PATENT DOCUMENTS

| | | | |
|---|---|---|---|
| 2,772,193 | 11/1956 | Ono | 156/296 |
| 3,076,232 | 2/1963 | Dengler | 264/289.6 |
| 3,214,503 | 10/1965 | Markwood | 264/210.0 |
| 3,324,217 | 6/1967 | Armstrong et al. | 264/210.2 |
| 3,619,319 | 11/1971 | Utz | 156/229 |
| 3,651,196 | 3/1972 | Starkweather | 264/210.7 |
| 3,674,583 | 7/1972 | Allport | 156/167 |
| 3,734,812 | 5/1973 | Yazgwa | 156/177 |
| 3,949,111 | 4/1976 | Pelletier | 156/181 |
| 4,503,007 | 3/1985 | Matsumoto | 264/210.7 |
| 5,152,946 | 10/1992 | Gillette | 264/342 RE |

FOREIGN PATENT DOCUMENTS

| | | | |
|---|---|---|---|
| 591604 | 1/1960 | Canada | 264/290.6 |
| 30648 | 6/1981 | European Pat. Off. | 264/210.7 |
| 2246051 | 4/1973 | Germany | 156/296 |
| 26463 | 2/1984 | Japan | 264/210.1 |
| 194106 | 10/1985 | Japan | 264/342 RE |
| 922737 | 4/1963 | United Kingdom | 156/296 |

*Primary Examiner*—Steven D. Maki
*Attorney, Agent, or Firm*—Foley & Lardner

[57] ABSTRACT

The present invention relates to a process for forming a polymeric pre-stretched grid for supporting a structure, such as an earthwork, wherein a suitable polymeric material, e.g. polyethylene, is used to make thin polymer strips by a molding machine, these strips are fully stretched by a pre-stretching machine so as to rearrange long bonds of polymer molecules to form the pre-stretched strips with high tensile strength, then these pre-stretched strips are crossed over each other longitudinally and transversely in line with a pre-set width by a machine (or manually) and the crossings of longitudinal and transverse network plies are united by gluing or hot fusion or otherwise to form a pre-stretched grid.

7 Claims, 3 Drawing Sheets

PROCESS FOR FORMING A GRID OF POLYMERIC MATERIAL FOR SUPPORTING A STRUCTURE

This application is a continuation-in-part of U.S. application Ser. No. 07/862,434, filed Apr. 2, 1992 now abandoned.

BACKGROUND OF THE INVENTION

The present invention relates to a process for forming a grid of polymeric material. Such grids are usefully applied to sites in need of water and soil protection such as slopes, retaining walls, protecting walls, protecting banks, breakwaters and wharves.

More than 3,000 years ago pre-stretched (prestressed) earth and clay materials making use of a tensile member were known and materials such as reed and rattan were applied to many large scale earthworks to reinforce clay, brick and granular soil. In 1963 the French civil engineer Henri Vidal developed a modern process for producing pre-stretched (prestressed) earthwork using linear pre-stretched strips of high tensile strength by taking advantage of selected granular soil as determined by his dynamic analysis. The basic concept of producing pre-stretched earth and clay materials was derived from the realization that the friction force generated from the mutual action between the contact faces of both materials, i.e., the soil in pre-stretched earth and the pre-stretched material, can resist the relative movement of these two materials. Thus, the pre-stretched material can prevent the pre-stretched earth material from being laterally deformed and provide it with a so-called apparent anisotropic cohesion which is proportional to the soil density and the tensile strength of the pre-stretched material. Based on the foregoing principle, the pre-stretched material applied to the filled earth may be in the shape of a plate, grid, network, tube, rope, bar, rod, chain, etc. So far as the nature of the material is concerned, regardless of whether it is an alloy, copper, galvanized carbon steel, stainless steel, reinforced glass fiber, polymer, wood or other material, if it has suitable tensile strength, friction resistance against the earth or clay material will be achieved, providing considerable durability and economy.

A previously proposed pre-stretched grid of polymeric material is a network polymer with high strength for application to a pre-stretched earth or clay material. The polymer generally used was a strong engineering material made from processing specially selected polyolefins and polyesters and particularly suitable for the purpose of long-range pre-stretching without any adverse chemical reaction.

A conventional polymer pre-stretched grid production has to use considerably complex equipment and a prior process is as follows:

(1) feeding polyethylene (or polypropylene or polyethylene terephthalate or other suitable polymeric material) into a molding machine for molding to make a thin polymer sheet;

(2) feeding the thin polymer sheet into a punching machine for evenly punching to form a thin polymer network sheet;

(3) feeding the punched thin polymer network sheet into a sectional pre-stretching machine for longitudinally stretching each, lateral row of holes one by one (when stretching, normally the thin polymer network sheet is suitably heated and softened and then stretched in a specific proportion and cooled with cold water or other cooling medium) so as to rearrange the long bonds of polymer molecules and provide longitudinally stretched network plies with a considerably high tensile strength and form a one-way pre-stretched grid as shown schematically in FIG. 1 of the accompanying drawings; and (4) feeding the one-way pre-stretched grid into another sectional pre-stretching machine for transversely stretching each lateral row of holes one by one so as to provide transversely stretched network plies with a high tensile strength and to form the two-way pre-stretched grid as shown schematically in FIG. 2 of the accompanying drawings.

The tensile strength of a typical polymer varies with the length of the polymerized carbon chain as shown schematically in FIG. 3 of the accompanying drawings; and more carbon chain atoms of polymer, the stronger the tensile strength thereof. The polymer appears as if all are straight bonds in the drawings but in fact there is a certain angle between two adjoining carbon bonds, so such a polymer will have an extremely high stretching magnitude when subject to tension.

In producing a conventional polymer pre-stretched grid, it is intended to eliminate the angle between the carbon bonds, and through the effect of directional disposition, the tensile strength of the polymer is considerably stepped up, and the yielding strength of polymer products achievable is between 20 k–50 k psi, which is almost the same as that of mild steel, of which the yielding strength is 30 k–36 k psi.

The foregoing conventional polymer pre-stretched grid is produced by punching a thin polymer sheet molded by a molding machine and then stretching each lateral row of holes one by one to form a square or rectangular grid so as to rearrange the bonds of polymer molecules. The process of stretching (see FIG. 2A) each lateral row of holes one by one between transverse lines 512 and 515; 516 and 519; 520 and 523 or longitudinal lines 526 and 529; 530 and 533 to form the grid is rather complex and slow. Concerning the stretching of grid network plies, as shown schematically in FIG. 2A and FIG. 4 of the accompanying drawings, the crossings of longitudinal and transverse network plies between 511 and 512; 515 and 516; 519 and 520; 523 and 524; 525 and 526; 529 and 530; 533 and 534 and parts of the front and rear network plies between 512 and 513; 514 and 515; 516 and 517; 518 and 519; 520 and 521; 522 and 523; 526 and 527; 528 and 529; 530 and 531; 532 and 533 are not stretched or are not fully stretched. Therefore, there is a certain angle between adjoining carbon bonds of polymer in the position of the network plies which will still have a very high stretching magnitude when subject to tension, so the unstretched and not fully stretched parts of the front and rear network plies result in a waste of polymer material. Also, because the ,conventional polymeric pre-stretched grid is produced by punching and stretching the thin polymer sheet molded by machine, the width thereof is limited by the width of the machine (less than 6 feet normally). Therefore, when there is a need to lay the sheet on a construction site, 10 to 30 cm of the sides of adjoining two sheets have to mutually overlapped, which is wasteful not only in material but also in manpower.

SUMMARY OF THE INVENTION

According to this invention there is provided a process for forming a grid of polymeric material for supporting a structure including the steps of molding a polymeric material to form relatively thin strips, stretching the strips to the required extent to rearrange the polymer molecules to form long bonds resulting in strips with high tensile strength, and forming a grid by bonding together longitudinally and transversely disposed or otherwise angularly disposed stretched strips.

Preferably the polymeric material comprises a polyolefin, e.g., polyethylene or polypropylene, or a polyester, e.g. polyethylene terephthalate. The bonding may be carried out by using an adhesive or by hot fusion. Conveniently the strips are formed by extrusion.

Thus, the present invention offers a process for producing a polymer pre-stretched grid wherein a suitable polymeric material may be extruded into strips by a machine, these strips may be stretched by a machine to form pre-stretched strips and may then be crossed longitudinally and transversely or otherwise angularly crossed and combined by gluing or hot fusion or other suitable process to form a pre-stretched grid whose width does not need to be limited, thereby simplifying the process, saving material and lowering the manufacturing cost.

DETAILED DESCRIPTION OF THE PREFERRED EMBODIMENTS

Figure 2:
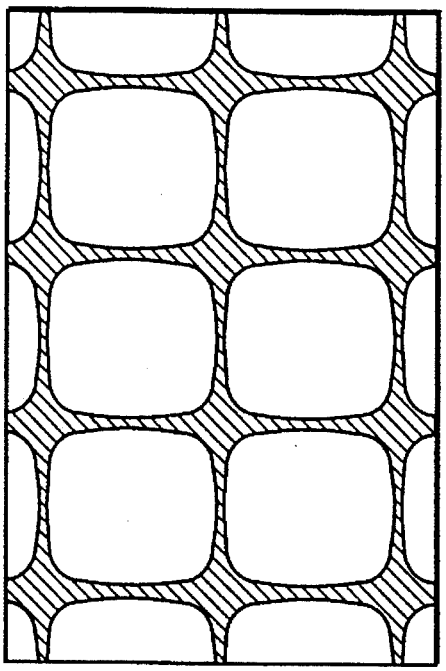
FIG. 2 shows a schematic view of a prior art two-way pre-stretched grid.
Figure 1:
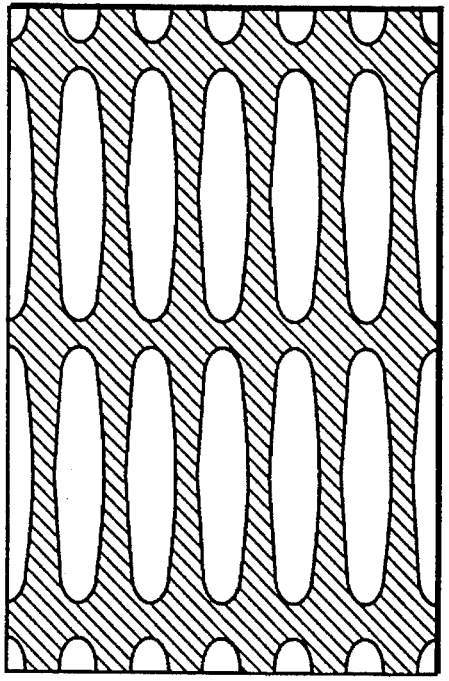
FIG. 1 shows a schematic view of a prior art one-way pre-stretched grid.
Figure 4:
FIG. 4 shows a section view of a prior art two-way pre-stretched grid.
Figure 2A:
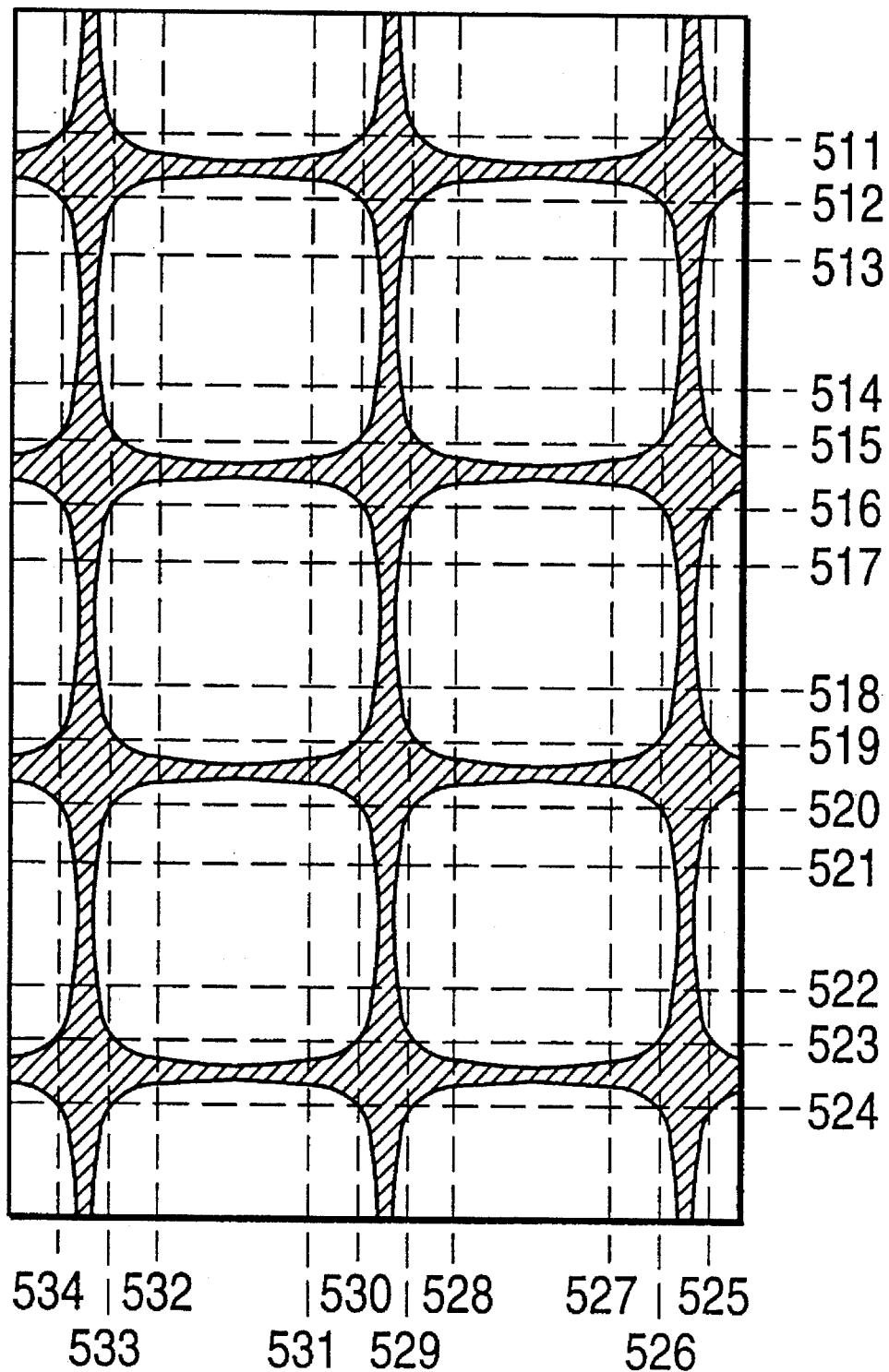
FIG. 2A shows an analytic view of a prior art two-way pre-stretched grid.
Figure 3:
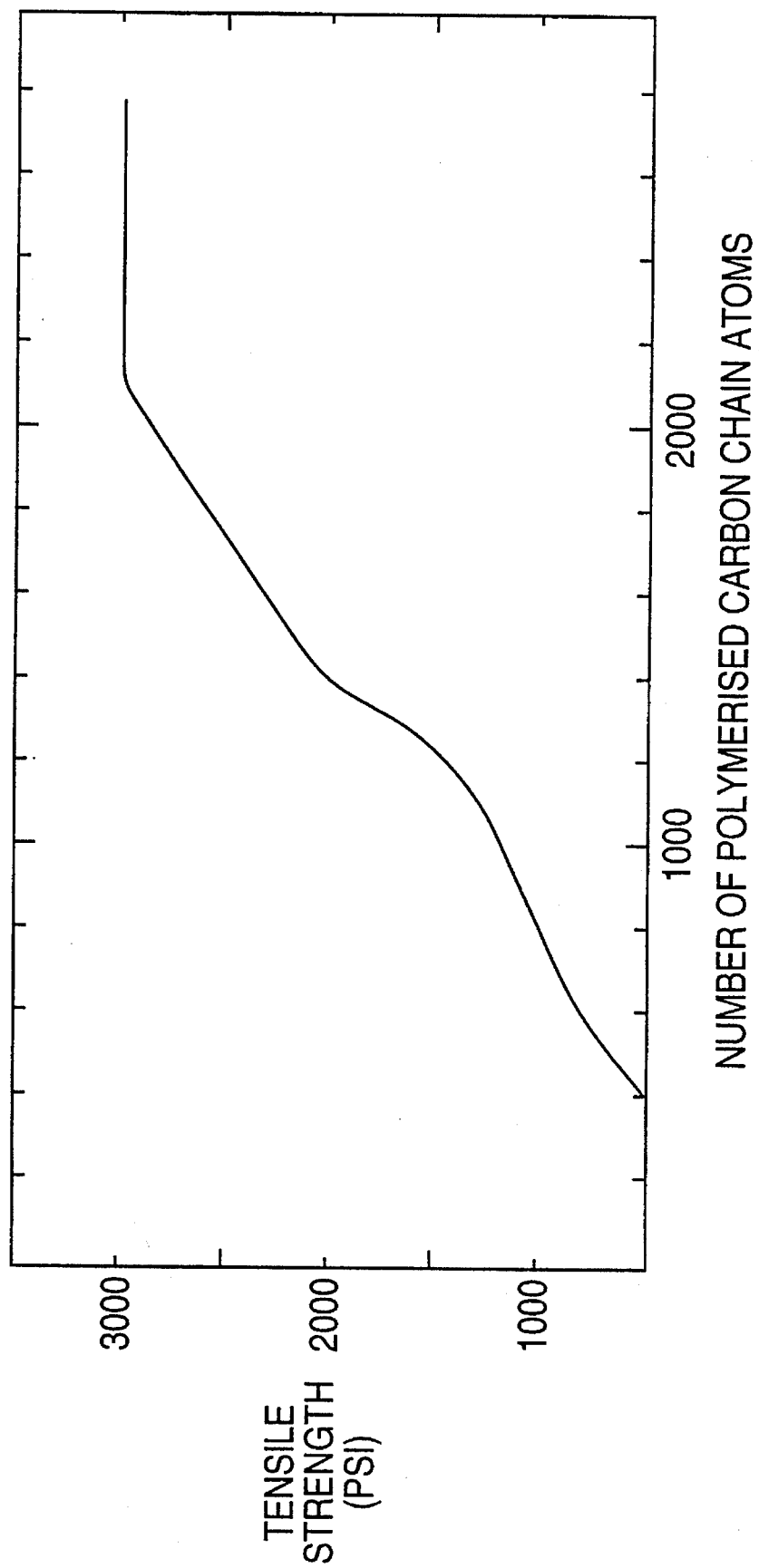
FIG. 3 shows how the tensile strength of a typical polymer varies with the length of polymerized carbon chain.

A process for producing a grid of polymeric material illustrative of the present invention is as follows:

(1) Polyethylene is fed into a molding machine for molding to make thin polymeric strips.

(2) The thin polymeric strips are fully stretched by a pre-stretching machine so as to rearrange long bonds of polymer molecules and form pre-stretched strips with high tensile strength.

(3) The pre-stretched strips are longitudinally and transversely crossed in line with a pre-set width thereof by a machine (or by hand if no machine is available) and the crossings of longitudinal and transverse network plies are combined by gluing or hot fusion to form the pre-stretched grid.

A more detailed process for producing a pre-stretched grid of polymeric material (e.g. polyethylene) is as follows:

1. Polyethylene is fed into a material trough;

2. After the polyethylene material is heated to a temperature of about 180° C. and melted down, a polyethylene strip is extruded by an extrusion machine at a speed of about 1.5 meter/minute;

3. A continuous polyethylene strip is formed having a width of about 80 millimeter and a thickness of about 5 millimeter;

4. The polyethylene strip is fed into a cool water trough to be cooled, the size of the cool water trough is (depth×width×length) about 30 centimeters×15 centimeters×2 meters;

5. The cooled polyethylene strip is transmitted by wheels at a speed of about 1.5 meters/minute;

6. The polyethylene strip is fed into a hot water trough to be heated to a temperature of about 95° C., the size of the hot water trough is (depth×width×length) about 30 centimeters×15 centimeters×3 meters;

7. The hot polyethylene strip is stretched by stretching wheels at a speed of about 10 meters/minute to rearrange long bonds of polymer molecules and form a pre-stretched strip with high tensile strength;

8. The pre-stretched strip is fed into a stable water trough and retracted 10% to be stable by hot water of 80° C., thereby forming a pre-stretched strip having a width of about 25 millimeters and a thickness of about 1.5 millimeters;

9. The retracted and stable pre-stretched strip is transmitted by wheels at a speed of about 9 meters/minute;

10. The pre-stretched strip is fed into a cool water trough to be cooled, the size of the cool water trough is (depth×width×length) about 30 centimeters×15 centimeters×2 meters;

11. The pull and stretched degree of the cooled and stable shaped pre-stretched strip are 850 kilogram and ±15%, respectively; .

12. The pre-stretched strips are crossed, longitudinally and transversely by a bonding machine (or by hand), then the crossings are united to form a pre-stretched grid.

The pre-stretched grid so produced results in a product with a high tensile strength because each longitudinal and transverse network ply has been fully stretched. The present invention avoids incomplete stretching of certain one-way network plies, avoids forming a dead space of stretched network plies at the longitudinal and transverse crossings of the plies, and avoids wasting the material in the unstretched part at the crossings.

The pre-stretched grid made as above is further characterized by the manufactured and processed width thereof not being limited by the length of a machine and by the capability of meeting the dimensions required by the construction site or being much wider so as to save material and cost.

The pre-stretched grid made as above is still further characterized by evenly stretching the whole network plies by machine, a simple manufacturing process, and even and reliable quality.

The most prominent advantages of the grid made as above consist in producing the pre-stretched grid with a uniform tensile strength because all the pre-stretched strips thereof have been fully stretched, and, in comparison with the conventional polymeric pre-stretched grid wherein the material is wasted in the unstretched part at the crossings of longitudinal and transverse network plies, approximately one third of the material may be saved.

What is mentioned above is a partial embodiment of the present invention which is not aimed at limiting the present invention, and various modifications, changes and applications thereof not departing from the spirit of the present invention are all included in the scope of the claims.

What is claimed is:

1. A process for forming a grid of polymeric material for supporting an earthwork, comprising the steps of:

feeding a polymeric material into a material trough;

melting the polymeric material by heating it to a temperature of about 180° C.;

extruding continuous strips having a width of about 80 mm and a thickness of about 5 mm at a speed of about 1.5 meter/minute;

cooling the strips in a cool water trough;

heating the strips to about 95° C. in a hot water trough;

stretching the heated strips with stretching wheels at a speed of about 10 meter/minute;

retracting the stretched strips about 10% in hot water at about 80° C., thereby forming strips having a width of about 25 mm and a thickness of about 1.5 mm; then cooling the strips in a cool water trough;

crossing the strips longitudinally and transversely; and bonding together the crossed strips at points of intersection.

2. The process of claim 1, wherein the polymeric material comprises a polyolefin.

3. The process of claim 2, wherein the polymeric material comprises polyethylene or polypropylene.

4. The process of claim 1, wherein the polymeric material comprises a polyester.

5. The process of claim 4, wherein the polymeric material comprises polyethylene terephthalate.

6. The process of claim 1, wherein the bonding step includes the step of bonding with an adhesive.

7. The process of claim 1, wherein the bonding step includes the step of bonding by hot fusion.

\* \* \* \* \*